Jan. 7, 1936.   A. H. HAUPT   2,026,533

APPARATUS FOR CUTTING PAPER OR OTHER MATERIAL

Filed Aug. 7, 1934

Albertus H. Haupt
by *Wager S. Brown*
Attorney

UNITED STATES PATENT OFFICE 2,026,533

APPARATUS FOR CUTTING PAPER OR OTHER MATERIAL

Albertus Hendrik Haupt, Somerset West, Union of South Africa, assignor to Imperial Chemical Industries Limited, a corporation of Great Britain Application August 7, 1934, Serial No. 738,886
In Great Britain August 10, 1933

5 Claims. (Cl. 164—66)

This invention relates to an improved method and apparatus for cutting paper or other sheet material into predetermined lengths, particularly where the material is in the form of a band or ribbon.

My apparatus comprises a mechanically operated rotary cutter whereby a strip or band or ribbon of material is continuously cut into pieces of a required and predetermined length, not at right angles or perpendicular to its length but obliquely into rhomboids or rhombs.

According to the present invention we provide two rollers with parallel axes and carrying helical knives which are adapted to slice the material as it passes between the rollers, the angle of the one helix being slightly greater than that of the other. The helical knives have adjacent recesses to enable them to mesh. The roller carrying the helical knife of smaller angle is driven and the knife on this roller presses against the knife on the other roller and causes it to revolve in the opposite direction at the same time as the material is cut. The helical knives do not extend completely around the rollers, and interrupted gears are provided to convey the drive to the other roller until the knives mesh once more. The rollers are cylindrical and are arranged parallel to one another and adjacent to one another throughout their lengths. The material to be cut is drawn or propelled between the rollers and as it passes through it is continuously cut into pieces of the desired shape and length.

The nature of my invention is illustraed in the accompanying diagrammatic drawing, in which the rollers are shown situated horizontally one above the other and in which.

Figure 1:
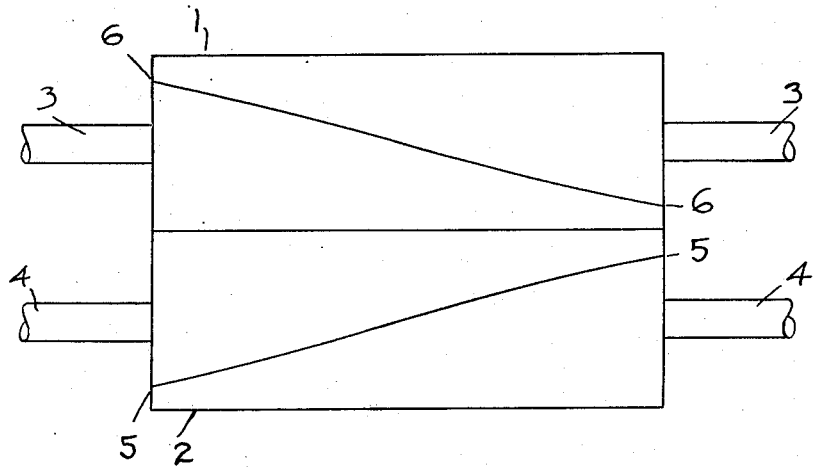
Figure 1 is an elevation of the cutting rollers showing the helical knives.

In Figure 1 the top roller 1 is shown touching or resting on the lower roller 2. The roller 1 is fixed to a shaft 3 which is supported on bearings (not shown) which may be of any well-known form. The roller 2 is fixed to shaft 4 which is likewise supported on bearings (not shown). The bearings are preferably of a type which permits of slight movement of the shafts, so that the latter may be moved apart from one another. Shaft 4 is driven at a constant speed from any suitable source of power.

Protruding from the surface of the roller 2 is a knife 5 which is in the form of a helix the angle of which is the same as that to which it is desired to cut the material. I preferably use a blade inserted in a groove wider than the blade and fastened into the roller by white or other metal caulked into the remaining space in the groove. The blade or knife may, however, be fastened in any other suitable manner such as by screws, dovetailing or welding, or it may be formed integrally with the roller.

Protruding from the surface of the roller 1 is a helical knife 6 similar to 5 in the roller 2, but the angle of the helix of knife 6 is slightly greater than that of knife 5; for instance if the helix of knife 5 is such that it will make one complete revolution in approximately 22 inches of length then I use a helix for knife 6 such that it will make a complete revolution in approximately 19 inches of length.

Recesses 5a and 6a are provided to enable the knives to mesh. The action of these knives is such that as roller 2 revolves the knife 5 pressing against knife 6 causes the roller 1 to revolve for part of a revolution, at the same time cutting or shearing the material 7. The knives are not necessarily arranged radially but may be slightly offset; the centre of the channel in which the cutters are mounted may be offset one quarter of an inch, and the cutting edge of the cutter may be offset three eighths of an inch from the diameter parallel to the centre line of the channel.

The further rotation of the roller 1 so that it may be in a position for the knife 6 to mesh with the knife 5 on roller 2 is accomplished by means of a pair of interrupted gears fastened to the shafts 3 and 4, which gears are not shown in the drawing.

Figure 2:
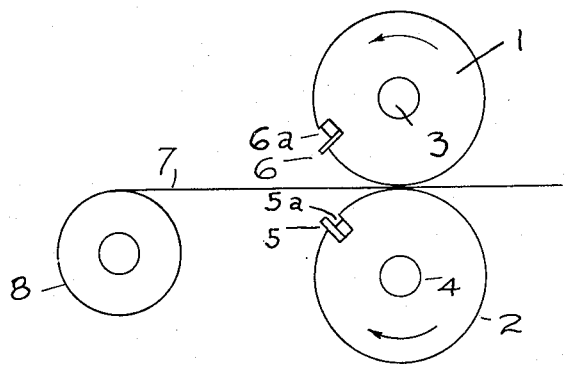
Figure 2 is an end elevation of the rollers showing the material passing between them.
Figure 3:
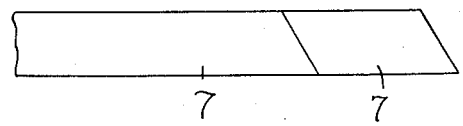
Figure 3 is a plan view of the material showing the form of division produced when the material enters the rollers at right angles to the nip.

The material 7 is shown in Figure 2 unwinding off a roll of materials 8 and being drawn forward by the action of the rollers.

The rollers may be made of such a size that they have a circumference or periphery of a length equal to the length of the cut off portion of material required, so that as well as cutting they at the same time act as feed rolls drawing the material 7 forward from the roll 8 at the required rate, but they may be so arranged that they do not grip the material which may be fed between them by any known method of feeding such material. If desired the rolls may be recessed over a portion of their circumference, so that during a period of the rotation while the rolls are being driven by the gears the material is not gripped. In this way a shorter wrapper may be obtained.

As many apparently widely different embodiments of this invention may be made without departing from the spirit and scope thereof, it is to be understood that I do not limit myself to the specific embodiments thereof except as defined in the appended claims.

I claim:—

1. An apparatus for cutting sheet material obliquely into sheets of predetermined length, which comprises a pair of rotatable, axially parallel, cooperating helical knives having different angles of inclination to the horizontal.

2. An apparatus for cutting sheet material obliquely into sheets of predetermined length, which comprises a pair of rotatable, axially parallel, cooperating, helical knives, the angle of inclination of one of said helical knives being the same as the angle to which it is desired to cut the sheet material, and less than the angle of inclination of the other of said helical knives.

3. An apparatus for cutting sheet material obliquely into pieces of predetermined length, which comprises two parallel cylindrical rollers provided with helical knives having different angles of inclination.

4. An apparatus for cutting sheet material obliquely into pieces of predetermined length, which comprises a pair of rotatable axially parallel cylinders, the first of which is provided with a peripheral, helical knife the angle of inclination of which is equal to the angle at which it is desired to cut said paper, while the second of said cylinders is provided with a cooperating, peripheral, helical knife the angle of inclination of which is slightly greater than that of the helical knife of the first cylinder, the cooperation of the respective helical knives being such that rotation imparted directly to the first cylinder causes the second cylinder to rotate at a slightly greater speed.

5. An apparatus according to claim 4, in which each cylinder is provided with a recess at the base of the helical knife.

ALBERTUS HENDRIK HAUPT.